US012760768B2

(12) United States Patent
Prevost

(10) Patent No.: US 12,760,768 B2
(45) Date of Patent: Oct. 13, 2026

(54) CLUTCH SYSTEM

(71) Applicant: Clemon Prevost, Texas City, TX (US)

(72) Inventor: Clemon Prevost, Texas City, TX (US)

( * ) Notice: Subject to any disclaimer, the term of this patent is extended or adjusted under 35 U.S.C. 154(b) by 0 days.

(21) Appl. No.: 19/295,876

(22) Filed: Aug. 11, 2025

(65) Prior Publication Data

US 2026/0049640 A1 Feb. 19, 2026

Related U.S. Application Data

(60) Provisional application No. 63/682,511, filed on Aug. 13, 2024.

(51) Int. Cl.
*F16D 13/38* (2006.01)
*F16D 13/58* (2006.01)
*F16D 13/71* (2006.01)

(52) U.S. Cl.
CPC ......... *F16D 13/385* (2013.01); *F16D 13/583* (2013.01); *F16D 13/71* (2013.01)

(58) Field of Classification Search
CPC ........ F16D 13/385; F16D 13/46; F16D 13/52; F16D 13/583; F16D 13/70; F16D 13/71
See application file for complete search history.

(56) References Cited

U.S. PATENT DOCUMENTS 3,981,381 A * 9/1976 Nosek .................... F16D 13/385 192/70.14
4,225,025 A * 9/1980 Crawford .............. F16D 13/385 188/71.1
5,355,984 A * 10/1994 Grabis .................. F16D 13/385 192/213.12
2003/0062238 A1* 4/2003 Ziegler ................. F16D 13/385 192/109 R
2006/0006040 A1* 1/2006 Orlamunder .......... F16D 13/385 192/70.27
2017/0097051 A1* 4/2017 Baumann ................ F16D 25/10
2019/0264754 A1* 8/2019 Hassler ................... F16D 13/70

* cited by examiner

*Primary Examiner* — Lori Wu
(74) *Attorney, Agent, or Firm* — Werner IP Law, P.C.

(57) ABSTRACT

A dual disc clutch system having a flywheel, at least one spacer ring, first and second clutch discs, the second clutch disc being spring-modified, a floater ring, and a pressure plate having a diaphragm spring which engages clamps the first and said second clutch discs against the flywheel. The system can be used to convert single disc clutch systems into dual disc clutch systems.

9 Claims, 4 Drawing Sheets

102
104
110
111
115

109
112
113

110
112

114
130

110
112
114

116
117

100
110
112
114
116

16
112
118
119

118
119
132

120
122

CLUTCH SYSTEM

CROSS REFERENCE TO RELATED APPLICATION

This application claims priority to U.S. Application No. 63/682,511 filed on Aug. 13, 2024, the disclosure of which is incorporated herein by reference for all purposes.

FIELD OF THE INVENTION

The present invention relates to a dual disc clutch system and, more particularly, to a system which can convert any existing single disc clutch system into a dual disc clutch system.

BACKGROUND OF THE INVENTION

Dual disc clutch systems (also known as twin clutch systems) were traditionally utilized in industrial and agricultural applications. They eventually were added to racing vehicles. The dual disc clutch increases the amount of torque achieved over that of a single disc system.

SUMMARY OF THE INVENTION

In one aspect, the present invention relates to a dual disc clutch system.

In another aspect, the present invention relates to a system which can be used to retrofit and convert an existing single disc clutch system into a dual disc clutch system.

DETAILED DESCRIPTION OF PREFERRED EMBODIMENTS

Figure 1:
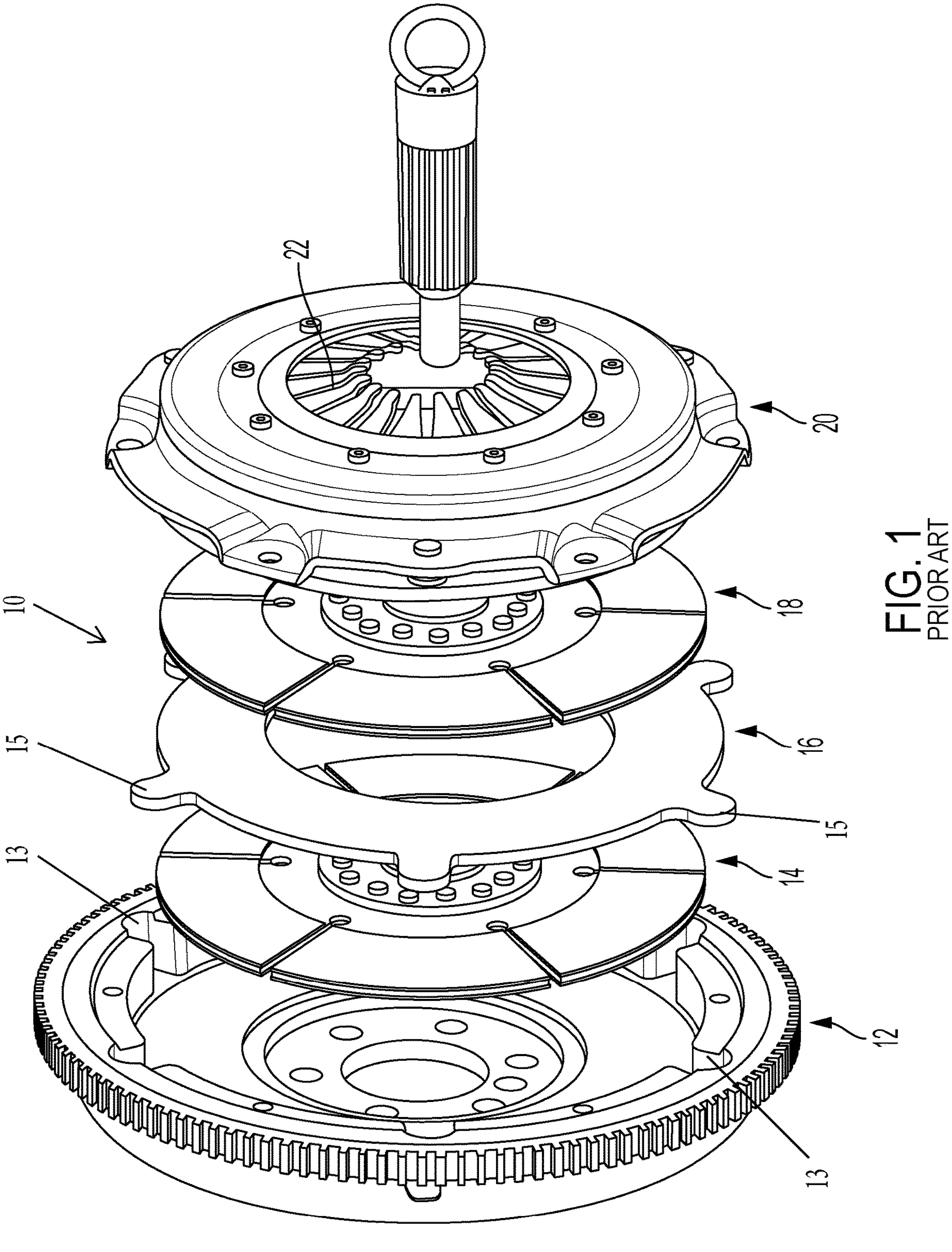
FIG. 1 PRIOR ART
FIG. 1 is an exploded view of a prior art dual disc clutch system.
Figures 2A, 2B, 2C, 2D, 2E, 2F, 2G, 2H, 2I, 2J:
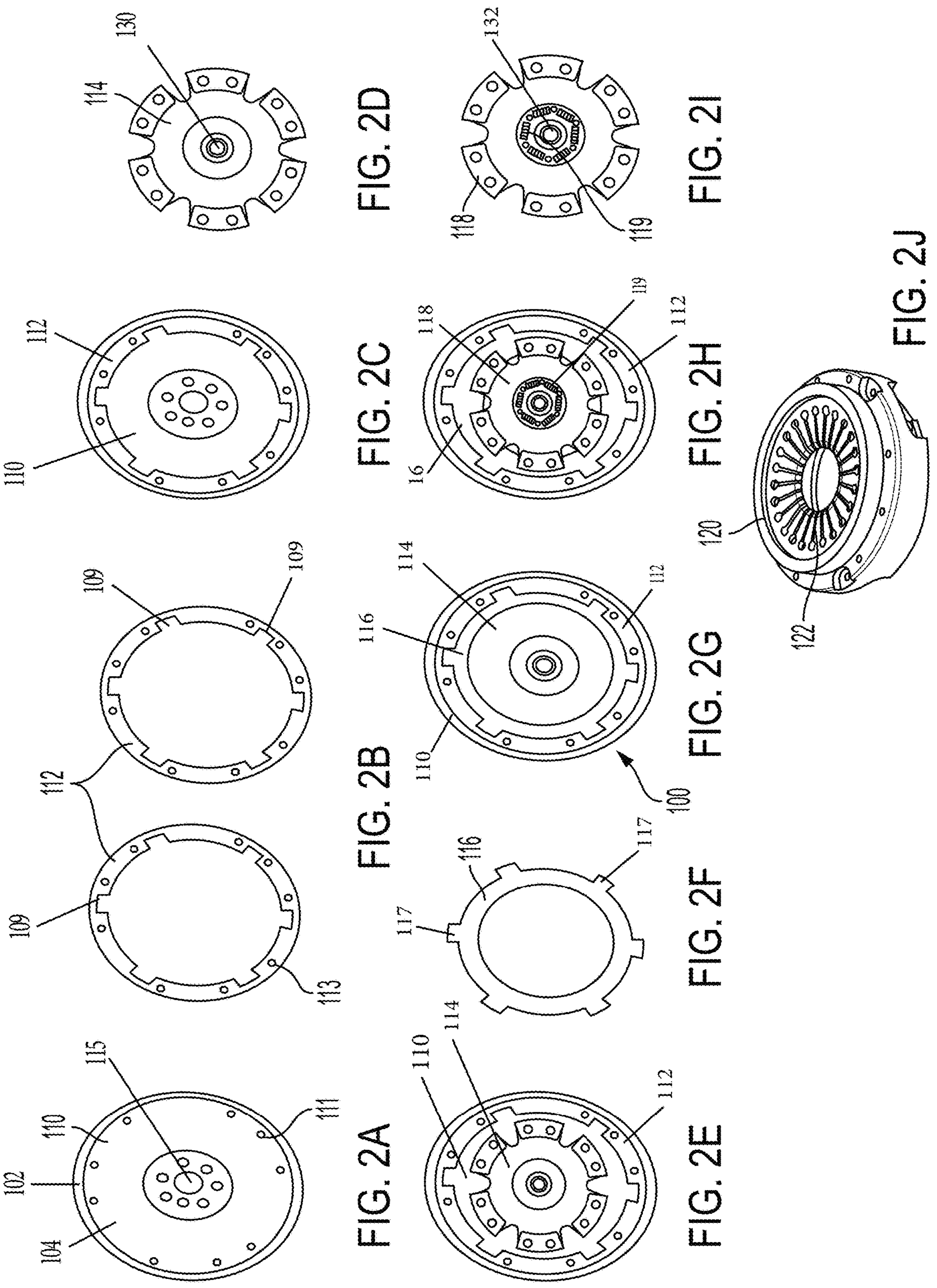
FIGS. 2A-2J depict the components of the dual disc clutch system of the present invention.
Figure 3:
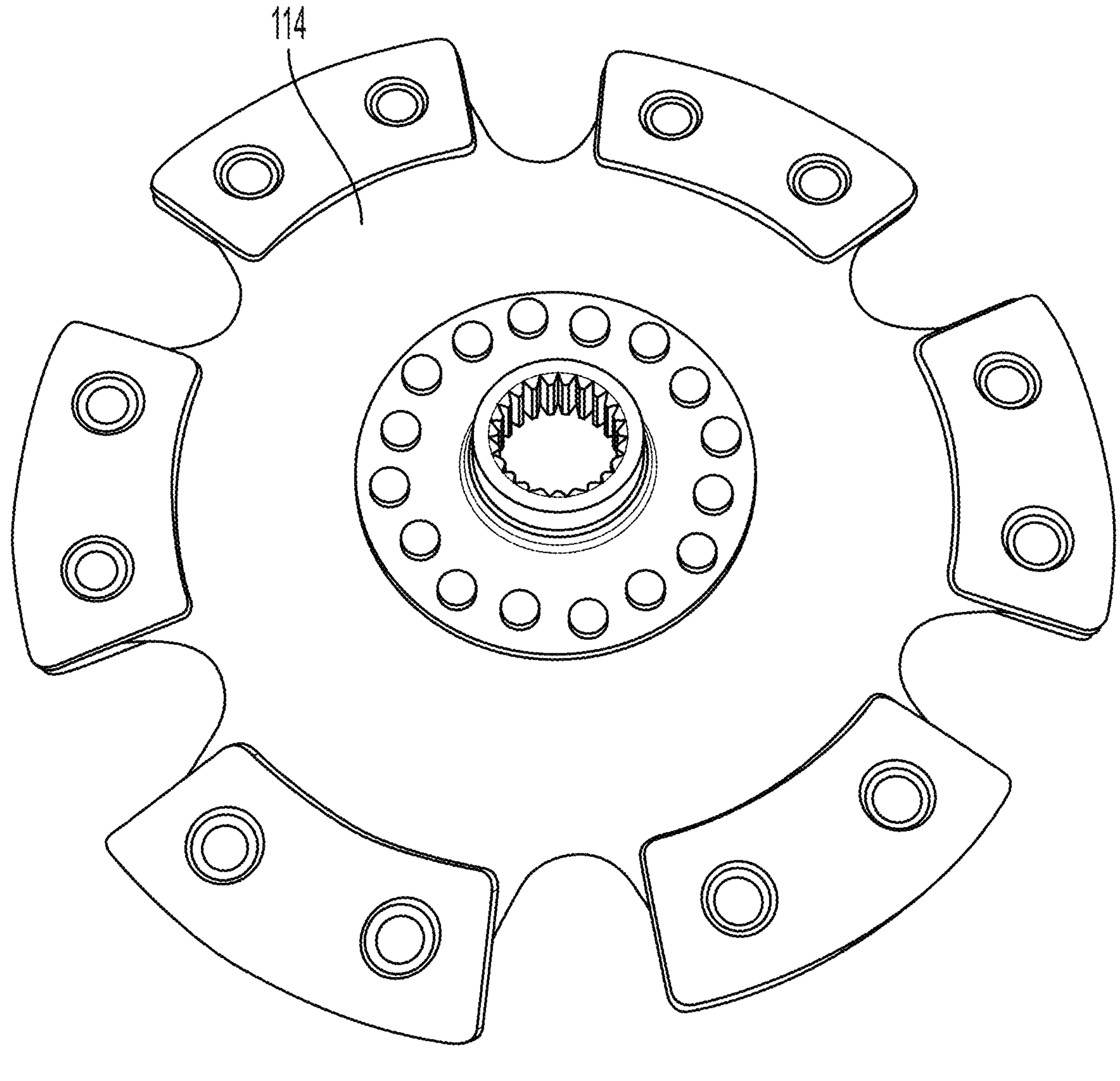
FIG. 3 is an enlarged view of the first disc of the clutch system of the present invention.
Figure 4:
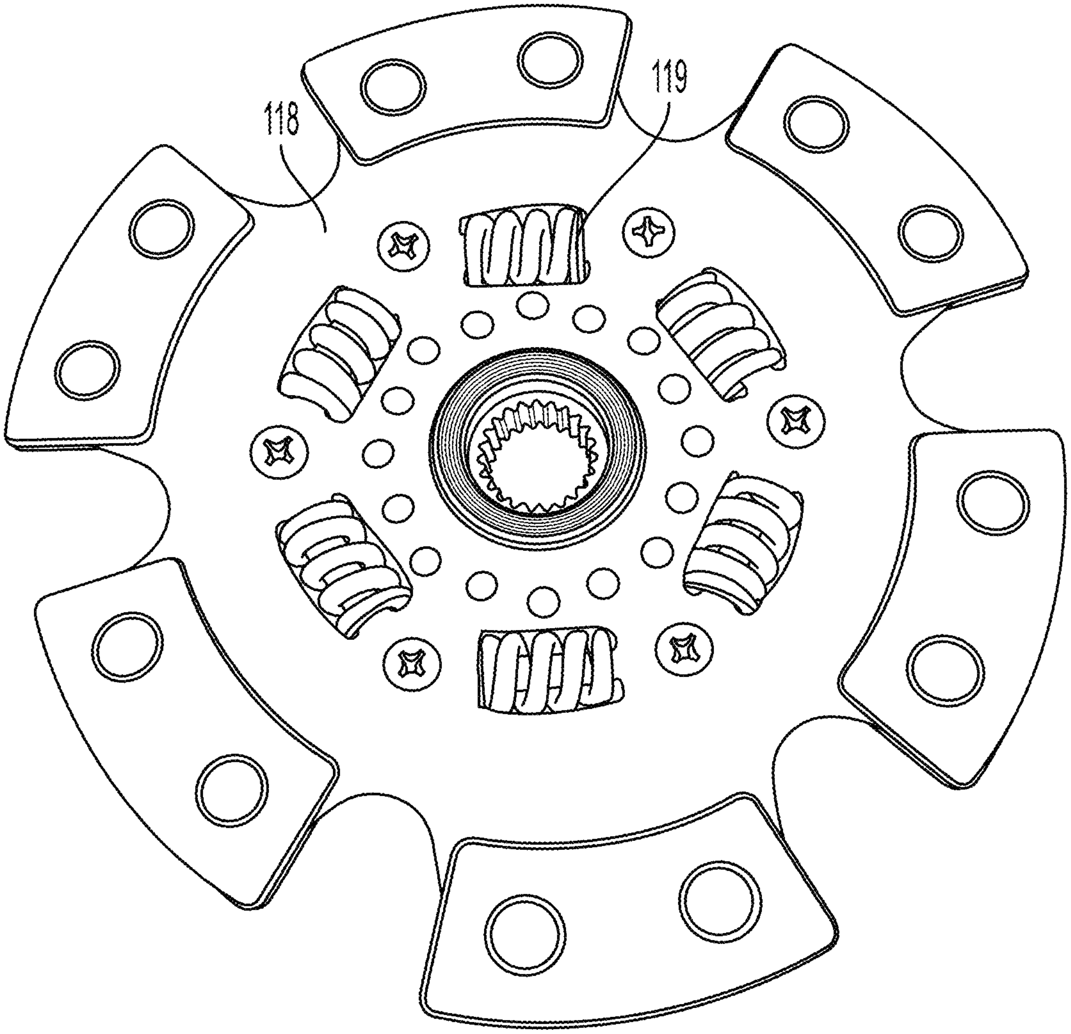
FIG. 4 is an enlarged view of the second disc of the clutch system of the present invention.

Embodiments of the invention are described more fully hereafter with reference to the accompanying drawings. Elements that are identified using the same or similar reference characters refer to the same or similar elements which perform the same functions across various embodiments. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Turning first to FIG. 1, there is a shown a prior art dual disc clutch system 10. The flywheel 12 is operatively connected to the engine via the crankshaft (not shown) and rotates in time with the crankshaft. The first disc 14 and second disc 18 are mounted on the input shaft of the transmission (not shown). A floater ring 16 (also known as a floater disc) is positioned between the first and second discs 14 and 18. Flywheel 12 includes receiving formations 13 which correspond to projections 15 on floater ring 16. When assembled, floater ring projections 15 fit inside receiving formations 13. Pressure plate 20 is mounted to the flywheel 12 and is operatively connected to the clutch pedal (not shown) of a vehicle. When the clutch pedal is not engaged (e.g., not being pressed down), the pressure plate clamps the first and second discs 14 and 18 against the flywheel 12. The floater ring projections 15 are fit in the formations 13 such that flywheel 12, floater ring 16, and discs 14, 18 thus all rotate together. The engagement or pressing of the clutch pedal causes the pressure plate to release the pressure such that floater ring 16 moves axially (or "floats") out of the formations 13. The first and second discs 14 and 18 then no longer rotate with the flywheel 12. The transmission can then change gears. The releasing of the clutch pedal, reengages the pressure plate such that engagement of the flywheel by floater 16 and rotation of the discs resume. The pressure plate 20 shown in FIG. 1 has a diaphragm spring 22 which is compressed and released. It will be appreciated that the exact nature of the pressure plate and the engagement thereof with the discs may vary and not every model utilizes the same diaphragm spring configuration. Such pressure plates are well known to those skilled in the art. It will also be appreciated that there are bolts, axles, mounts, connectors, etc. which are not depicted in FIG. 1, but which are well known to those of skill in the art.

Turning to FIGS. 2A-2J there is shown one embodiment of a dual disc clutch system 100 of the present invention. The system of the present invention includes flywheel 110 which, as with prior art flywheels, is positioned on the crankshaft (not shown) of a vehicle. Flywheel 110 includes a peripheral wall 102 and an engagement surface 104. The crankshaft extends through opening 115. Flywheel 110 is configured for a single disc clutch system. Since a single disc system does not require a floater ring between discs, the flywheel lacks any formations for engaging a floater ring. Thus, at least one spacer ring 112 is mounted to the flywheel. As shown in FIG. 2, there are two spacer rings which are each ¼ inch thick. It will be appreciated that these could be replaced with a single ½ inch thick spacer ring, or one or more spacer rings of differing thickness as needed. The bolt holes 113 are in register with the bolt holes 111 of flywheel 110. Spacer rings 112 have formations 109 in them. As shown in image 2C, the spacer rings 112 are mounted to flywheel 110. Image 2D shows an example of a first disc 114. First disc 114 has an opening 130 through which the crankshaft extends and which is in register with opening 115 of flywheel 110. Image 2E shows the first disc 114 positioned within the flywheel 110. Image 2F shows a floater ring 116 (also known as a floater disc) and image 2G shows the floater ring on flywheel 110. Floater ring 116 has projections 117 which line up with receiving formations 109. Image 2I shows an example of a second disc 118. Disc 118 has an opening 132 through which the crankshaft extends and which is in register with opening 115 of flywheel 110. Disc 118 has been spring modified. The springs 119 act as shock absorbers to keep the dual disc system from rattling or chattering when in use. Image 2H shows the second disc 118 positioned in flywheel 110. Wall 102 of flywheel 110 has a height sufficient to hold the various components discussed herein. Image 2J shows pressure plate 120 mounted on the system of FIG. 2H. Pressure plate 120 includes a diaphragm spring 122 and bolt holes 124 which are in register with bolt holes 111 and 113. Bolts (not shown) extend through respective bolt holes to hold the components together. It will be appreciated that the exact number and configuration of bolts or other mounting components may vary. Such features are well known to those skilled in the art and not necessary to describe herein. It will be appreciated that some single disc clutch systems may use a different type of pressure plate. When the system of the present invention is being used to retrofit and convert an existing single disc clutch system to a dual disc clutch system, the pressure plate of the original single disc clutch system may be used.

The pressure plate 120 is operatively connected to the clutch pedal of a vehicle by means well known to those skilled in the art. When the clutch pedal is not engaged (e.g., not being pressed down), the pressure plate clamps the first and second discs 114 and 118 against the flywheel 110. The flywheel 110, spacer rings, floater ring 116, and discs 114 and 118 thus all rotate together. The engagement or pressing of the clutch pedal causes the pressure plate to release the pressure such that the first and second discs 114 and 118 are no longer clamped down. Floater ring 116 moves axially (or "floats") so that it is no longer received in or engaged with the spacer ring formations 109. Thus the discs 114 and 118 and floater ring 116 no longer rotate with the flywheel 110. The transmission can then change gears. The releasing of the clutch pedal, reengages the pressure plate such that pressure is returned. Floater ring 116 reengages the spacer ring formations 109 and rotation of the discs with the flywheel resumes. The specifics of the operation of a pressure plate are long established and well known to those skilled in the art.

In a single disc clutch system, the components and the flywheel are configured such that a second disc cannot simply be added. Rather the entire flywheel and system must be replaced. A typical single disc flywheel does not include the machined formations such as formations 13 shown in FIG. 1. Thus a floater ring would not be able to engage with a single disc flywheel. Additionally, most dual disc systems are large and bulky and would not fit within the bell housing of a single disc system. Applicant's unique system allows for an existing single disc system to be converted to a dual disc system. The spacer rings 112 attached to the single disc flywheel provide the formations for floater ring 116. The system of the present invention however allows for the conversion of a single disc clutch system to a dual disc clutch system. The original flywheel, first disc, and pressure plate can be kept (provided they are in good condition and not in need of repair/replacement). By adding the spacer ring(s), the floater ring, and the second, spring-modified disc, the single disc system can become a dual disc system. The spacer ring(s) can be sized as needed to accommodate different sized flywheels or components. The dual disc clutch system provides increased torque over the single disc clutch system.

Although specific embodiments of the invention have been described herein in some detail, this has been done solely for the purposes of explaining the various aspects of the invention and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A dual disc clutch system, comprising:

a flywheel having an engagement surface and a peripheral wall axially extending from said engagement surface;

at least one spacer ring, said at least one spacer ring having a radially outer surface and a radially inner surface, said radially outer surface having no formations or projections;

a first clutch disc, said first clutch disc not being spring-modified;

a floater ring;

a second clutch disc, said second clutch disc being spring-modified;

a pressure plate having a diaphragm spring, said pressure plate releasably clamping said first clutch disc and said second clutch disc against said flywheel; and said peripheral wall being of a height sufficient to encompass at least one spacer ring, said first clutch disc, said floater ring, and said second clutch disc.

2. The dual clutch disc system of claim 1, comprising more than one spacer ring, each of said more than one spacer rings having a radially outer surface and a radially inner surface, each of said radially outer surfaces having no formations or projections.

3. The dual clutch system of claim 1, wherein said at least one spacer ring has at least one receiving formation along said radially inner surface.

4. The dual clutch system of claim 3, wherein said floater ring has at least one projecting formation thereon, said projecting formation releasably fitting within said receiving formation.

5. The dual clutch system of claim 1, wherein said spacer ring has a thickness of from ¼ to ½ inch.

6. A dual disc clutch system, comprising:

a flywheel having an engagement surface and a peripheral wall axially extending from said engagement surface;

at least one spacer ring mounted within said peripheral wall, said at least one spacer ring having a radially outer surface and a radially inner surface, said radially outer surface having no formations or projections, said at least one spacer ring having at least one receiving formation along said radially inner surface;

a first clutch disc mounted within said peripheral wall;

a floater ring mounted within said peripheral wall, said floater ring having at least one projecting formation thereon, said projecting formation releasably fitting within said receiving formation;

a second clutch disc mounted within said peripheral wall, said second clutch disc being spring-modified; and a pressure plate having a diaphragm spring, said pressure plate releasably clamping said first clutch disc, said floater disc, and said second clutch disc against said flywheel, whereby said clamping by said pressure plate moves said projecting formation into engagement with said receiving formation, releasing of said clamp by said pressure plate causes said projecting formation to come out of engagement with said receiving formation.

7. The dual clutch disc system of claim 6, comprising more than one spacer ring, each of said more than one spacer rings having a radially outer surface and a radially inner surface, each of said radially outer surfaces having no formations or projections.

8. The dual clutch system of claim 6, wherein said spacer ring has a thickness of from ¼ to ½ inch.

9. A dual disc clutch system, comprising:

a flywheel having an engagement surface and a peripheral wall axially extending from said engagement surface;

at least one spacer ring mounted within said peripheral wall, said at least one spacer ring having a radially outer surface and a radially inner surface, said radially outer surface having no formations or projections, said at least one spacer ring having at least one receiving formation along said radially inner surface;

a first clutch disc mounted within said peripheral wall;

a floater ring mounted within said peripheral wall, said floater ring having at least one projecting formation thereon, said projecting formation releasably fitting within said receiving formation;

a second clutch disc mounted within said peripheral wall, said second clutch disc being spring-modified;

a pressure plate having a diaphragm spring, said pressure plate releasably clamping said first clutch disc, said floater disc, and said second clutch disc against said flywheel, whereby said clamping by said pressure plate moves said projecting formation into engagement with said receiving formation, releasing of said clamp by said pressure plate causes said projecting formation to come out of engagement with said receiving formation; and said peripheral wall being of a height sufficient to encompass at least one spacer ring, said first clutch disc, said floater ring, and said second clutch disc.

* * * * *